(12) United States Patent
Schiavini

(10) Patent No.: US 12,366,479 B2
(45) Date of Patent: Jul. 22, 2025

(54) LIGHTING SYSTEM CALIBRATION

(71) Applicant: SIGNIFY HOLDING B.V., Eindhoven (NL)

(72) Inventor: Pablo Mortari Schiavini, Curitiba (BR)

(73) Assignee: SIGNIFY HOLDING B.V., Eindhoven (NL)

( * ) Notice: Subject to any disclaimer, the term of this patent is extended or adjusted under 35 U.S.C. 154(b) by 246 days.

(21) Appl. No.: 18/036,458

(22) PCT Filed: Nov. 18, 2021

(86) PCT No.: PCT/EP2021/082094
§ 371 (c)(1),
(2) Date: May 11, 2023

(87) PCT Pub. No.: WO2022/106515
PCT Pub. Date: May 27, 2022

(65) Prior Publication Data
US 2024/0003740 A1    Jan. 4, 2024

(30) Foreign Application Priority Data
Nov. 20, 2020  (EP) ..................................... 20208893

(51) Int. Cl.
*G01J 3/02*  (2006.01)
*A01G 7/04*  (2006.01)
(Continued)

(52) U.S. Cl.
CPC ............ *G01J 3/0297* (2013.01); *A01G 7/045* (2013.01); *A01K 29/005* (2013.01); *G01J 3/0294* (2013.01);
(Continued)

(58) Field of Classification Search
CPC .......... G01J 3/0297; G01J 3/0294; G01J 3/10; G01J 2003/104; H05B 45/22; A01G 7/045; A01K 29/005
See application file for complete search history.

(56) References Cited

U.S. PATENT DOCUMENTS

| | | | | |
|---|---|---|---|---|
| 4,239,390 A | * | 12/1980 | Scherer | ..................... G01J 3/44 356/326 |
| 6,915,955 B2 | * | 7/2005 | Jung | ....................... G01J 3/508 235/462.17 |

(Continued)

FOREIGN PATENT DOCUMENTS

| | | |
|---|---|---|
| WO | 2011036612 A1 | 3/2011 |
| WO | 2018227305 A1 | 12/2018 |

(Continued)

OTHER PUBLICATIONS

Cocetta Giacomo et al., "Light use efficiency for vegetables production in protected and indoor environments", The European Physical Journal Pluus, Springer Berlin Heidelberg, Berlin/Heidelberg, vol. 132, No. 1, Jan. 25, 2017 (Jan. 25, 2017), pp. 1-15, XP036143458, DOI: 10.1140/EPJP/I2017-11298-X.

*Primary Examiner* — Adam D Houston

(57) ABSTRACT

A method is provided of calibrating a lighting system to enable conversion between i) light output settings for a plurality of lighting channels of the lighting system, each channel having a respective color spectrum from a first set of color spectra, and ii) a light intensity at an area of interest for each of a second set of color spectra. The method derives a calibration matrix, based on a set default light outputs from the lighting channels, a mapping to light spectra to be measured, and light intensities measured at those light spectra. This calibration procedure takes advantage of the fact that using the same measurement device conventionally used for a simple calibration, it is possible to retrieve not (Continued)

only the total measured PPFD, but also partial PPFD values per spectral range.

15 Claims, 1 Drawing Sheet

(51) Int. Cl.
    *A01K 29/00*     (2006.01)
    *G01J 3/10*     (2006.01)
    *H05B 45/22*     (2020.01)

(52) U.S. Cl.
    CPC ............... *G01J 3/10* (2013.01); *H05B 45/22* (2020.01); *G01J 2003/104* (2013.01)

(56) References Cited

U.S. PATENT DOCUMENTS

| | | | | |
|---|---|---|---|---|
| 8,363,069 | B2* | 1/2013 | Aldrich | H05B 47/17 345/83 |
| 10,225,909 | B2* | 3/2019 | Hung | H05B 47/105 |
| 11,265,983 | B2* | 3/2022 | Petluri | H05B 45/20 |
| 2006/0018118 | A1* | 1/2006 | Lee | H05B 45/22 362/231 |
| 2008/0180665 | A1* | 7/2008 | Redman | G01J 3/0208 356/326 |
| 2011/0137757 | A1 | 6/2011 | Paolini et al. | |
| 2013/0003064 | A1* | 1/2013 | Allen | G01J 3/0254 356/402 |
| 2013/0293114 | A1* | 11/2013 | Tipirneni | H05B 45/20 445/3 |
| 2013/0307419 | A1* | 11/2013 | Simonian | H05B 45/20 315/153 |
| 2015/0296589 | A1* | 10/2015 | Melanson | H05B 45/40 315/151 |
| 2017/0084250 | A1* | 3/2017 | Jia | G01J 3/10 |
| 2018/0080825 | A1* | 3/2018 | Learmonth | G01J 3/0297 |
| 2020/0045892 | A1 | 2/2020 | Aikala | |
| 2020/0132549 | A1* | 4/2020 | Hromin | G01J 3/513 |
| 2020/0134741 | A1 | 4/2020 | Bongartz et al. | |
| 2021/0329754 | A1* | 10/2021 | De Samber | F21V 9/40 |
| 2023/0314215 | A1* | 10/2023 | Cheng | G01J 3/501 250/252.1 |
| 2024/0003740 | A1* | 1/2024 | Schiavini | G01J 3/0297 |
| 2024/0321400 | A1* | 9/2024 | Kim | G01N 21/274 |

FOREIGN PATENT DOCUMENTS

| | | |
|---|---|---|
| WO | 2019025317 A1 | 2/2019 |
| WO | WO-2024003159 A1 * | 1/2024 |

* cited by examiner

LIGHTING SYSTEM CALIBRATION

CROSS-REFERENCE TO PRIOR APPLICATIONS

This application is the U.S. National Phase application under 35 U.S.C. § 371 of International Application No. PCT/EP2021/082094, filed on Nov. 18, 2021, which claims the benefit of European Patent Application No. 20208893.6, filed on Nov. 20, 2020. These applications are hereby incorporated by reference herein.

FIELD OF THE INVENTION

The invention relates to the calibration of lighting systems, in particular so that they may be controlled to deliver a known light intensity and color spectrum to an area of interest.

BACKGROUND OF THE INVENTION

For a variety of reasons there is an interest in mixing different colors of light with a specific light intensity. The particular light intensity distribution is for example of interest in plant or animal farming, in which light plays a significant role in plant growth, animal behavior and animal reproduction.

The light spectrum is defined as a nanometer-range of the radiation spectrum. By way of example, in horticultural applications, the light spectrum is considered as having a blue region (400-499 nm), a green region (500-599 nm), a red region (600-699 nm), and a far-red region (700-799 nm). The boundaries between different regions are of course somewhat arbitrary and indeed the light spectrum may be divided into a greater or lesser number of regions.

The light flux provided by a luminaire may, especially in a horticulture context, be measured in micromoles per second (μmol/s) and it is called the Photosynthetic Photon Flux (PPF). This is the total light radiation output in all directions of a luminaire or any other light emitting device (which will in this document simply be called a luminaire) per unit of time.

The light intensity (also referred to as irradiance) can be measured in micromoles per second per square meter (μmol/s/m$^2$) and it is called the Photosynthetic Photon Flux Density (PPFD). This light intensity measurement at a certain location depends on the number of luminaires used in an area and by understanding the specifics of that area, e.g., height, reflection index, etc.

The procedure to establish the light intensities, in micromoles per second per square meter, in a particular installation/configuration/setup of a luminaire is known as the calibration of the luminaire. By performing this calibration, it is known how many micromoles per second will 'arrive' on a specific square meter.

A specific mix of light colors, where each light color can have a different light intensity, is called a spectral power distribution (SPD) of light. Varying the spectral power distribution over time is referred to as a light recipe. A light recipe may include a timed switching on and off of light with a spectral power distribution or may include a timed variation of the spectral power distribution of light. A light recipe can be used in a variety of application areas, such as horticulture, livestock farming, fish farming, but is not limited to these application areas. For all applications, light intensity measurements, spectral power distributions and recipes are used, since it is the actual amount of light that is projected into an area of interest at a particular time that determines the effectiveness of the lighting in achieving a desired aim.

To create a desired spectral power distribution of light, mixing light colors with a specific light intensity per light color is possible by powering the light sources, such as LED chips, used in a luminaire in a variety of ways. To realize the desired spectral power distribution of light using a luminaire, the following factors are important:

(i) The combination of LED chips used in the luminaire.
(ii) The maximum power that the luminaire can handle.
(iii) The color spectrum (multi-color radiation) that is radiated by each individual LED chip.

A LED chip provides a specific spectral distribution, for example blue, white, deep red, or far-red. However, in some cases, a LED chip radiates not only its own spectrum or color within the full color spectrum, but it also has an overlap with other spectra or colors in the full color spectrum from other LED chips. This behavior is seen in particular when there is use of a white LED chip. White is a combination of blue, green, red and far-red.

When a desired spectral power distribution is to be created, it is thus important to implement the exact correct combination of light colors each with a specific light intensity. For example, when powering the white LED chip, a variety of light colors is radiated, giving multi-color radiation.

The factors above make it difficult to create a specific desired spectral power distribution and desired light recipe.

For example, if a white LED chip of a luminaire is turned on, this will automatically have an impact on the amount blue, green, and red light in the spectral power distribution of the overall light output from the luminaire.

As another example, if the amount of green light in the spectral power distribution of the overall light output is to be maximized and only a white LED chip is available, this may only be possible by allowing at least a minimum amount of blue, red and far-red to the emitted by the white LED. In other words, it is not possible to have zero blue light output and maximum greenlight output.

It is known to provide a function which allows the light output characteristics of the luminaire in terms of luminous flux or radiant flux to be converted to light intensity at an area of interest in terms of illuminance or irradiance. In order to make this conversion, from PPF in μmol/s into PPFD in μmol/s/m$^2$, a light measurement is performed at an area of interest for a specific light setting in the luminaire.

For example, in a horticulture facility such a greenhouse or a multi-layered indoor farm, a light measurement is performed at the canopy level of the crop for the specific light setting in the luminaire.

Since a luminaire typically has from one to four dimmable lighting channels, a specific calibration dimming level is set (usually 50-70% level for all channels) on all luminaires in the crop area. The next step is to use a light spectrum measurement device that can measure the total light intensity at the crop level, for example in the spectral range of interest, such as in the range of 400 nm to 800 nm. Once the measurement is done, a calibration constant is calculated:

$$k = \frac{PPFD_{cal}}{PPF_{cal}}$$

$PPFD_{cal}$ is the measured PPFD at the calibration setting, and $PPF_{cal}$ is the calculated PPF at the calibration setting based on luminaire technical specifications.

With the calibration constant k, it is possible to convert a desired PPFD into luminaire drive levels, i.e. the luminaire PPF, as well as converting the current luminaire drive levels, i.e. luminaire PPF, into current PPFD in the crop.

As simple and effective as the simple calibration procedure is, it does not consider the different spectral ranges involved in a multi-channel, multi-spectrum luminaire. Two main sources of errors can arise from this calibration method:

First, it does not consider the different reflective properties of the environment in which the luminaires are installed. For instance, a certain greenhouse or indoor farm may have a certain environment that has a higher reflection for red and far-red colors. A constant calibration value would amplify blue and green PPFD and attenuate red and far-red PPFD.

Second, it does not consider the luminaire production variability in the lighting channels. For example, depending on the LED manufacturer batch, certain types of LED might have deviations from reference technical specification of up to 10%. A constant calibration value does not take that into account and distributes the error into the other channels that could otherwise be within the specification. If a LED part number has a significant output reduction compared to its technical specification, once the luminaires are fabricated, it becomes virtually impossible to compensate for this problem only by using the current calibration procedure.

There is therefore a need for a calibration procedure which addresses the above issues.

SUMMARY OF THE INVENTION

The invention is defined by the claims.

According to one aspect disclosed herein, there is provided a method of calibrating a multi-channel lighting system to enable conversion between i) light output settings for a plurality of lighting channels of the multi-channel lighting system, each lighting channel corresponding to a respective color spectrum from a first set of color spectra, and ii) a light intensity at an area of interest for each of a second set of color spectra, the method comprising:

obtaining a set of total light outputs from the multi-channel lighting system, each one of the set being for a respective lighting channel when the lighting channel is operated at a respective calibration setting, as default stored calibration information;

obtaining a spectral distribution mapping between the first set of color spectra and the second set of color spectra, as default stored mapping information;

setting each of the lighting channels to their respective calibration settings;

obtaining a measured light intensity for each of the second set of color spectra at the area of interest; and deriving a calibration matrix, based on the set of total light outputs, the spectral distribution mapping and the measured light intensities, which calibration matrix provides calibration of the second set of color spectra.

This method generates a calibration matrix that for example converts non-calibrated lighting system outputs in terms of luminous flux values (e.g. photosynthetic photon flux, PPF, values) for the first set of color spectra into calibrated spectral distribution values in terms of illuminance values (e.g. photosynthetic photon flux density, PPFD, values) for the second set of color spectra. This calibration matrix compensates for different reflection indexes for different spectral ranges because it is based on actual measurements of color spectra at the area of interest. It also cancels out spectral deviation between light source batches.

The total light output from the lighting system may refer to the light output generated by one luminaire of the lighting or the combined light output from a plurality of luminaires of the lighting system that contribute to the illumination at the area of interest, i.e. the area where the light intensity is measured.

The lighting system in particular may be a multi-channel lighting system wherein each channel of the multi-channel lighting system is designed to provide light output in a spectral range of one of the first set of color spectra. The multi-channel lighting system may comprise multi-channel luminaires where each channel for the multi-channel luminaire is configured to provide light output in a spectral range of one of the first set of color spectra. In examples, the number and/or light spectrum for the channels of the multi-channel luminaires correspond to the number and/or light spectrum of the channels of the multi-channel lighting system. However, in other examples, the number and/or light spectrum for the channels of the multi-channel luminaires is a subset of the number and/or light spectrum of the channels of the multi-channel lighting system and different multi-channel luminaires, in terms of number and/or light spectrum of available channels, may be combined to the provide the multi-channel lighting system. The multiple channels in a multi-channel luminaire may be individually controllable in terms of drive signal, light output or luminous flux each of the channels generates.

The terms "light output", "light output characteristic", "luminous flux", "radiant flux" and "drive signal" or "drive level" may be uses interchangeably in the present disclosure. Similarly, the terms "light intensity", "illuminance" and "irradiance" may be used interchangeably in the present disclosure. The first set of color spectra are the colors of the lighting channels. The first set may be overlapping, for example the first set may include white next to blue, red and/or far-red. The second set of color spectra are different parts of the color spectrum which are to be measured as part of the calibration. The spectra of the second set are for example non-overlapping. For the example of a horticultural application, the measurements may be made for blue 400-499 nm, green 500-599 nm, red 600-699 nm and far-red 700-799 nm. The overall range thus includes the photosynthetically active light spectrum (400-700 nm). Different light spectra will however be of interest for other applications. The calibration procedure can for example be used for all current and future color-controlled luminaires with 2, 3 or 4 channels, and more channels are also possible. In general, the first set of color spectra and the second set of color spectra may differ in the number of color spectra in the set and/or the spectral range of the color spectra in the set.

The method may be implemented with the use of only one spectral measurement for the overall second set of color spectra. The measurement process may involve an application engineer or trained operator or installer setting the lighting system to the calibration levels, waiting for optimal thermal stabilization of the luminaires, placing the (expensive) measurement equipment such as for example a multi-spectral light sensor at the appropriate height and inclination to correspond to the area of interest, and then performing the measurement for each part of the spectrum (i.e. for each color spectrum of the second set).

The disclosed method may for example enable a calibration service to achieve a calibration error below 5%, compared to a typical 10% error in existing calibration approaches using a single calibration value. The calibration error may be seen as the (average) error between the expected/desired light intensities across the entire spectral range or each individual spectral range of the second set of color spectra and the measured light intensities across the respective entire spectral range or individual spectral ranges.

The first set of color spectra may have the same or a smaller number of spectra than the second set of color spectra.

Thus, there is the same or a smaller number of luminaire channels than the number of lighting measurements to be taken. The method improves the calibration matrix used in mapping the spectral distribution between first set of color spectra associated with the drive signals applied to the channels to generate the light outputs or luminous flux values and the second set of color spectra linked associated with the desired light intensities or illuminance values in the specific spectral measurement bands of interest.

The first set of color spectra may have the same number of spectra as the second set of color spectra. Thus, the spectral distribution mapping may then comprise a square matrix.

The method may comprise obtaining or determining an inverse mapping.

The inverse spectral distribution mapping may be a simple matrix inverse, when the first and second sets of color spectra have the same number of spectra, so that the spectral distribution mapping is a square matrix. If the first and second sets of color spectra have different numbers of spectra, the inverse is obtained by a different inverse function, such as a so-called "left inverse of a non-square matrix".

The method may also comprise determining an inverse of the overall calibration matrix, for use in converting between a desired light intensity or illuminance at the area of interest and the required light output settings or luminous flux of the plurality of lighting channels.

The inversion enables conversion from desired PPFD values into luminaire PPF values.

The first set of color spectra may comprise three or more color spectra corresponding to three or more lighting channels, and the second set of color spectra comprises three or more color spectra. Thus, the method is then used for a multi-channel (3 or more) lighting system and multi-channel (3 or more) measurement in different ranges of the spectrum.

The first set of color spectra may comprise deep red, blue, white and far-red, and the second set of color spectra may comprise blue, green, red and far-red. The color spectra of the second set are for example non-overlapping whereas the color spectra of the lighting channels may overlap.

The method may comprise deriving the calibration matrix by combining:
  the inverse spectral distribution mapping;
  the set of total light outputs;
  the measured light intensities, converted from the second set of color spectra to the first set of color spectra using the inverse spectral distribution mapping; and
  the spectral distribution mapping.

In particular, the method may comprise deriving the calibration matrix K as:

$$K = S \cdot \text{diag}(S^{-1} \cdot PPFD_{cal}) \cdot \text{diag}(PPF_{cal|ch})^{-1} \cdot S^{-1}$$

in which:
  $PPFD_{cal}$ is a vector of the measured light intensities;
  $PPF_{cal|ch}$ is a vector of the total light outputs;
  S is a spectral distribution matrix defining the spectral distribution mapping;
  $S^{-1}$ is a spectral distribution matrix defining an inverse spectral distribution mapping; and
  diag( . . . ) is the diagonal matrix operator.

The method may comprise measuring the light intensity or illuminance for each of the second set of color spectra at the area of interest. Thus, the method then comprises the actual measurement process (rather than only processing the received measurement results).

The method is for example for calibrating a horticultural lighting system, wherein the area of interest at which the light intensities are measured comprises a plant canopy.

According to a further aspect disclosed herein, there is provided a computer program comprising computer program code means which is adapted, when said program is run on a computer, to implement the method defined above.

According to a still further aspect disclosed herein, there is provided a lighting system comprising:
  a luminaire having a plurality of lighting channels, each lighting channel being (individually) controllable to provide light output in a particular color spectrum from a first set of color spectra; and
  a memory stored therein a calibration matrix for converting between non-calibrated light outputs in terms of luminous flux per lighting channels and the resulting light intensity in terms of illuminance at an area of interest, for each of a second set of color spectra; and
  a processor adapted to determine the calibration matrix using the method defined above.

The processor may be adapted to execute the computer program code of the computer program defined above to implement the method defined above.

The lighting system may comprise a horticultural lighting system, wherein the area of interest comprises a plant canopy. The lighting is for example used to control plant growth.

The lighting system may instead comprise an animal farming system, wherein the area of interest comprises a the location of animals. The lighting is for example used to control animal feeding habits, or reproduction cycles.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
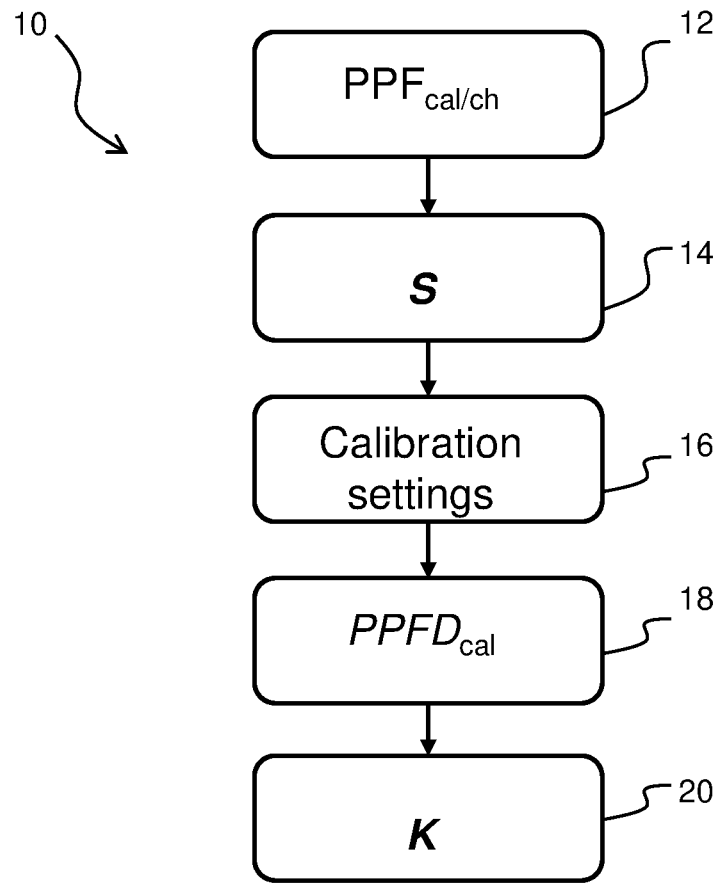
FIG. 1 shows a calibration method for a lighting system.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

A method of calibrating a lighting system to enable conversion between i) light output settings for a plurality of lighting channels of the lighting system, each channel having a respective color spectrum from a first set of color spectra, and ii) a light intensity at an area of interest for each of a second set of color spectra is disclosed. The method derives a calibration matrix, based on a set default light outputs from the lighting channels in a calibration setting, a spectral distribution mapping to light spectra to be measured, and light intensities measured at those light spectra.

This calibration procedure takes advantage of the fact that using the same measurement device used for the simple calibration, it is possible to retrieve not only the total measured PPFD, but also partial PPFD values per spectral range of interest.

FIG. 1 shows the method 10 for obtaining the calibration matrix. The calibration matrix converts between non-calibrated light outputs and the resulting light intensity at an area of interest, for each of a set of color spectra of interest.

The method comprises step 12 of obtaining a set of total light outputs $PPF_{cal|ch}$ from the lighting system, each one of the set being for a respective lighting channel when the lighting channel is operated at a respective calibration setting, as default stored calibration information. This stored calibration information is provided by the luminaire manufacturer.

In step 14, a spectral distribution mapping S is obtained between the first set of color spectra and the second set of color spectra, as default stored mapping information.

This requires knowledge of both the light spectrum of the light output from the different lighting channels and the light spectrum at which light intensity measurements (described below). The luminaire is typically intended to be calibrated for particular spectral ranges on interest at a location of interest. For example, for horticultural applications, it may be assumed by the luminaire manufacturer that a calibration will be performed based on a particular set of measurements, e.g. 400-499 nm, 500-599 nm, 600-699 nm and 700-799 nm.

The luminaire manufacturer may indeed be responsible for the installing and calibration of the luminaire system. Thus, the spectral distribution mapping S may also be provided by the luminaire manufacturer as default information.

However, it is possible for the calibration engineer or installer to choose different light measurement spectra, in which case the calibration engineer or installer may instead establish the spectral distribution mapping based on the luminaire lighting channel information.

In step 16, each of the lighting channels is set to their respective calibration settings corresponding to the total light outputs of step 12).

In step 18, the calibration engineer or installer obtains a measured light intensity $PPFD_{cal}$ for each of the second set of color spectra at the area of interest. This involves setting the lighting system to the calibration levels in step 16 (i.e. driving the lighting channels of the luminaire(s) with a drive signal corresponding to the calibration setting of the lighting system), waiting for optimal thermal stabilization of the luminaire(s), and placing the spectral measurement equipment at the appropriate height and inclination to correspond to the area of interest. The measurement is performed for each part of the spectrum in the second set of color spectra (i.e. for each color spectrum of the second set) but this may be performed as a single measurement simultaneously measuring light intensities in multiple spectral ranges so there is only one spectral measurement for the overall second set of color spectra.

In step 20, the calibration matrix K is obtained based on the set of total light outputs, the spectral distribution mapping and the measured light intensities.

This method thus generates a calibration matrix that converts non-calibrated lighting system outputs in terms of luminous flux values (i.e. photosynthetic photon flux, PPF, values) into calibrated spectral distribution values in terms of illuminance values (i.e. photosynthetic photon flux density, PPFD, values) for each color spectrum of the second set (i.e. the colors at which the measurements are taken). The calibration matrix compensates for different reflection indexes for different spectral ranges because it is based on actual measurements of the illuminance at the area of interest. The method also cancels out spectral deviation between light source batches.

The first set of color spectra are the colors of the lighting channels. The first set may comprise overlapping color spectra for example the first set may include white next to other colors overlapping with or being part of white. The second set of color spectra comprises different parts of the color spectrum which are to be measured as part of the calibration. The spectra of the second set are for example non-overlapping.

The calibration matrix is obtained as:

$$K = S \cdot \text{diag}(S^{-1} \cdot PPFD_{cal}) \cdot \text{diag}(PPF_{cal|ch})^{-1} \cdot S^{-1}$$

In this equation:

$PPFD_{cal}$ is the measured PPFD vector with luminaires at the calibration setting. For a four spectral measurement (namely blue, green, red, far-red), the vector contains four values.

$PPF_{cal|ch}$ is the calculated PPF vector at the calibration setting per channel, based on the luminaire specifications. For example, a four-channel luminaire (for instance, deep-red, blue, white, far-red LED's) would comprise four PPF values in the PPF vector, whereas a two-channel luminaire (for instance, deep-red and white) would comprise two values in the PPF vector.

diag( . . . ) is the diagonal matrix operator. It converts a N×1 vector into a N×N diagonal matrix.

S is the spectral distribution mapping mentioned above. It may be considered to be a spectral distribution matrix. It converts or distributes lighting channel spectra into spectra of interest at the area of interest, wherein a lighting channel spectrum (from the first set of color spectra) may contribute to or overlap with one or more spectra of interest (from the second set of color spectra).

For a 4 spectra luminaire, it is a 4×4 matrix where the rows represent the spectra to be measured (for instance, blue, green, red, far-red) and the columns represent the luminaire LED channel distribution (for instance, deep-red, blue, white, far-red).

For a 2-channel or 3-channel luminaire (i.e. the first set has 2 or 3 spectra) with four measurements (i.e. the second set has four spectra), the spectral distribution mapping S is a 4×2 or 4×3 matrix, respectively.

$S^{-1}$ is an inverse spectral distribution mapping, such as the inverse matrix of the spectral distribution matrix.

When the number of luminaire channels and the number of spectral distribution ranges to be measured are the same (for example, a 4 channel luminaire with 4 measurements), it is the inverse of square matrix S.

When the number of channels of the luminaire is smaller than the number of spectral distribution ranges (for example, a 2-channel luminaire or 3-channel luminaire with 4 measurements), the inverse spectral distribution mapping may be the square-root inverse of matrix S:

$$S^{-1} = (S^T S)^{-1} S^T$$

This is known as the "left inverse of a non-square matrix".

For a system with C lighting channels and M measurement spectra (wherein M≥C), the matrix dimensions are shown below beneath the calibration matrix equation:

$$K = S \cdot \text{diag}(S^{-1} \cdot PPFD_{cal}) \cdot \text{diag}(PPF_{cal/ch})^{-1} \cdot S^{-1}$$

S: M×C
S: C×M
$PPF_{cal/ch}$: C×1 (a column vector)
$PPFD_{cal}$: M×1 (a column vector)
$S^{-1} \cdot PPFD_{cal}$: C×1 (a column vector)
$\text{diag}(S^{-1} \cdot PPFD_{cal})$: C×C
$\text{diag}(PPF_{cal/ch})^{-1}$: C×C
K: M×M The result is thus a calibration square matrix K that can be used in a conversion from non-calibrated spectral values such as luminous flux values for certain given spectral ranges (PPFs for a first set of color spectra) into calibrated spectral values such as illuminance values for certain desired spectral ranges (PPFDs for a second set of color spectra). In case of M desired spectral ranges, the calibration matrix K is a M square matrix.

The calibration matrix K has dimension M×M. It converts non-calibrated PPF values (e.g. blue, green, red, far-red in μmol/s) to calibrated PPFD values (e.g. blue, green, red, far-red in μmol/s/m²), regardless of the number of channels in the luminaire.

In practice, when calibrating the illuminance in certain desired spectral ranges in the field, the calibration matrix is only used in the second step of the calibration. The first step would be to convert spectral values per luminaire channel (C-dimension) into spectral values per desired spectral range of interest (M-dimension).

For example, in a 2-channel luminaire with red and white channels, given a luminaire setting of 100 μmol/s red and 100 μmol/s white, the process comprises:

(i) Convert the non-calibrated luminaire channel settings (PPF) (red, white in μmol/s) to non-calibrated spectral values (PPF) in the desired spectral ranges of interest (blue, green, red, far-red in μmol/s) using the S matrix. The result would be something like: red=120 μmol/s, blue=40 μmol/s, green=30 μmol/s, far-red=10 μmol/s;

(ii) Convert the non-calibrated spectral values (PPF) in the desired spectral ranges of interest (blue, green, red, far-red in μmol/s) to calibrated illuminance values (PPFD) in the field for the desired spectral ranges of interest (blue, green, red, far-red in μmol/s/m²) using the calibration matrix K.

The end result would be something like red=61 μmol/s/m², blue=21 μmol/s/m², green=16 μmol/s/m², far-red=6 μmol/s/m²

This calibration matrix cancels out both problems described above for the simple calibration procedure: it cancels out different reflection indexes for different spectral ranges, and as well as it cancels out LED batch spectral deviation from specifications.

For the reverse case, given a desired calibrated illuminance (PPFD) in the field for the desired spectral ranges of interest (blue, green, red, far-red in μmol/s/m²) and desiring to obtain corresponding luminair channel settings (PPF), the process comprises:

(i) Convert the spectral calibrated illuminance values (PPFD) in the desired spectral ranges of interest into non-calibrated spectral values (PPF) in the desired spectral ranges of interest using $K^{-1}$;

(ii) Convert the non-calibrated spectral values (PPF) in the desired spectral ranges of interest to non-calibrated luminaire channel settings (PPF) using $S^{-1}$.

An example of a possible use of the method will now be explained for a horticulture luminaire.

In this example, a customer would like to calibrate the light levels on the crop provided by a four-channel luminaire comprising a deep red, blue, white and far-red channel. The following data and matrices are then used.

Luminaire LED channel description:

$$\begin{bmatrix} \text{Deep red} \\ \text{Blue} \\ \text{White} \\ \text{Far-red} \end{bmatrix}$$

Luminaire data based on technical information:

$$PPF_{cal/ch} = \begin{bmatrix} 102.1 \\ 41.6 \\ 38.6 \\ 33.7 \end{bmatrix} \begin{bmatrix} \text{Deep red} \\ \text{Blue} \\ \text{White} \\ \text{Far-red} \end{bmatrix} \mu\text{mol/s} \rightarrow \text{diag}(PPF_{cal/ch}) =$$

$$\begin{bmatrix} 102.1 & 0 & 0 & 0 \\ 0 & 41.6 & 0 & 0 \\ 0 & 0 & 38.6 & 0 \\ 0 & 0 & 0 & 33.7 \end{bmatrix}$$

$$S = \begin{bmatrix} 0 & 1 & 0.27 & 0 \\ 0 & 0 & 0.48 & 0 \\ 1 & 0 & 0.22 & 0.06 \\ 0 & 0 & 0.03 & 0.94 \end{bmatrix} \begin{bmatrix} \text{Blue} \\ \text{Green} \\ \text{Red} \\ \text{Far-red} \end{bmatrix} \text{rows} \times \text{columns} \begin{bmatrix} \text{Deep red} \\ \text{Blue} \\ \text{White} \\ \text{Far-red} \end{bmatrix}$$

In this S matrix, column 3 for example indicates that the white channel contributes 0.27% of its light in the blue spectral range, plus 0.48% of its light in the green spectral range, plus 0.22% of its light in the red spectral range, plus 0.03% of its light in the far-red spectral range.

The inverse spectral distribution mapping provides the inverse relationship:

$$S^{-1} = \begin{bmatrix} 0 & -0.46 & 1 & -0.06 \\ 1 & -0.57 & 0 & 0 \\ 0 & 2.07 & 0 & 0 \\ 0 & -0.04 & 0 & 1.06 \end{bmatrix} \begin{bmatrix} \text{Deep red} \\ \text{Blue} \\ \text{White} \\ \text{Far-red} \end{bmatrix} \text{rows} \times \text{columns} \begin{bmatrix} \text{Blue} \\ \text{Green} \\ \text{Red} \\ \text{Far-red} \end{bmatrix}$$

In this $S^{-1}$ matrix, column 4 for example indicates that far-red measurement is a contribution from −0.06 times the deep red channel, plus 1.06 times the far-red channel in the luminaire.

An application engineer or luminaire/system installer sets up the spectral measurement device in the crop area, at a specified height and position, and reads the measured illuminance data (PPFD):

Calibration data based on measurements in the field:

$$PPFD_{cal} = \begin{bmatrix} 48.5 \\ 18.7 \\ 119.8 \\ 33.64 \end{bmatrix} \begin{bmatrix} \text{Blue} \\ \text{Green} \\ \text{Red} \\ \text{Far-red} \end{bmatrix} \mu mol/s/m^2 \rightarrow \text{diag}(PPFD_{cal}) =$$

$$\begin{bmatrix} 48.5 & 0 & 0 & 0 \\ 0 & 18.7 & 0 & 0 \\ 0 & 0 & 38.6 & 0 \\ 0 & 0 & 0 & 33.7 \end{bmatrix}$$

Using the above data and matrices and the previously proposed calibration matrix equation, the final calibration matrix is calculated that converts non-calibrated PPF into calibrated PPFD:

$$K = \begin{bmatrix} 0.910 & 0.053 & 0 & 0 \\ 0 & 1.003 & 0 & 0 \\ 0 & -0.031 & 1.070 & -0.002 \\ 0 & -0.001 & 0 & 1.032 \end{bmatrix} ; \begin{bmatrix} \text{Blue} \\ \text{Green} \\ \text{Red} \\ \text{Far-red} \end{bmatrix} \times \begin{bmatrix} \text{Blue} \\ \text{Green} \\ \text{Red} \\ \text{Far-red} \end{bmatrix}$$

As an application example, the customer can calculate the real illuminance (PPFD) at the crop based on a luminaire setting of 100 μmol/s blue and 100 μmol/s red:

$$PPFD =$$

$$K \cdot PPF = \begin{bmatrix} 0.910 & 0.053 & 0 & 0 \\ 0 & 1.003 & 0 & 0 \\ 0 & -0.031 & 1.070 & -0.002 \\ 0 & -0.001 & 0 & 1.032 \end{bmatrix} \cdot \begin{bmatrix} 100 \\ 0 \\ 100 \\ 0 \end{bmatrix} = \begin{bmatrix} 91 \\ 0 \\ 107 \\ 0 \end{bmatrix} \mu mol/s/m^2$$

Another application example of the use of the calibration matrix is, given a desired illuminance level (PPFD) at the crop of 50 μmol/s/m² blue and 50 μmol/s/m² red, the luminaire settings would be:

$$PPF =$$

$$K^{-1} \cdot PPFD = \begin{bmatrix} 1.099 & -0.058 & 0 & 0 \\ 0 & 0.997 & 0 & 0 \\ 0 & 0.029 & 0.934 & 0.002 \\ 0 & 0.001 & 0 & 0.969 \end{bmatrix} \cdot \begin{bmatrix} 50 \\ 0 \\ 50 \\ 0 \end{bmatrix} = \begin{bmatrix} 54.9 \\ 0 \\ 46.7 \\ 0 \end{bmatrix} \mu mol/s$$

Figure 2:
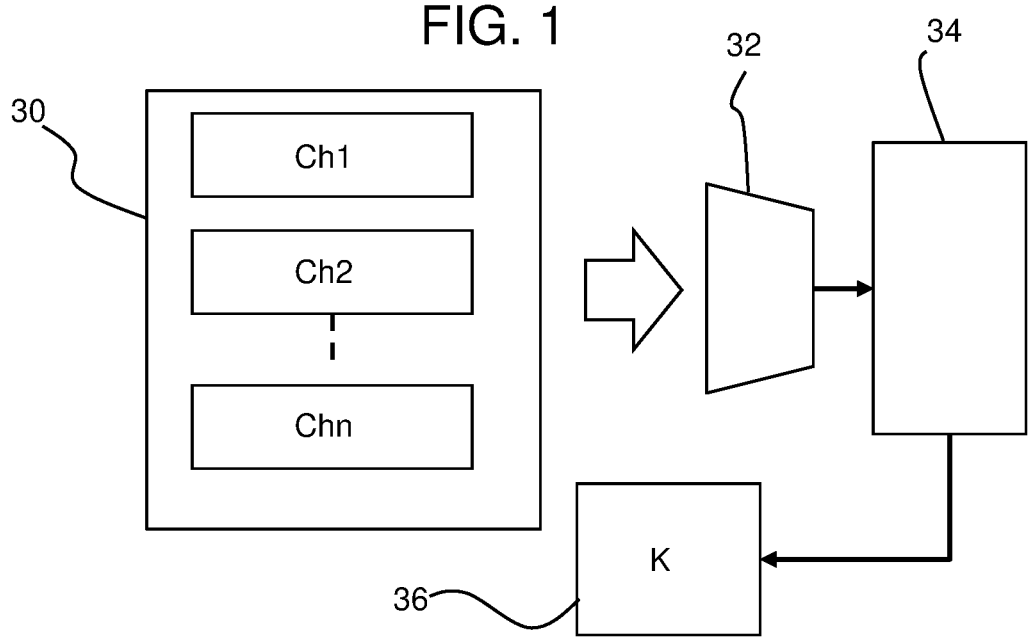
FIG. 2 shows a lighting system, and a system for performing the calibration method.

FIG. 2 shows a lighting system, and a system for performing the calibration method.

The lighting system comprises a luminaire 30 with a set of channels Ch1 . . . Chn, the different channels for example formed by LED chips with different color outputs. Of course, other light sources may be used. The luminaire can be controlled to set the channels to different intensity levels, for example the calibration setting prescribed by the luminaire manufacturer.

A light sensor 32 is able to measure light intensities for different portions of the spectrum to provide the measurements described above. The measurements (as well as the spectral distribution mapping S and the manufacturer light output information $PPF_{calIch}$ relating to the calibration setting) are processed in a processor 34, and the calibration matrix K 36 is obtained. The calibration matrix K 36 may be stored in a memory associated with the lighting system or luminaire 30. Also the spectral distribution mapping and the manufacturer light output information may be stored in a memory associated with the lighting system or luminaire 30.

An example of horticulture lighting is given above but the calibration method may be applied to any lighting system needing accurate control of a light output color and intensity to be delivered to a target area.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method of calibrating a multi-channel lighting system to enable conversion between i) light output settings in terms of luminous flux for each of a plurality of lighting channels of the multi-channel lighting system, each lighting channel corresponding to a respective color spectrum from a first set of color spectra, and ii) a light intensity in terms of illuminance at an area of interest for each of a second set of color spectra, the method comprising:
    obtaining a set of total light outputs in terms of luminous flux values from the multi-channel lighting system, each one of the set being for a respective lighting channel when the lighting channel is operated at a respective calibration setting, as default stored calibration information;
    obtaining a spectral distribution mapping S between the first set of color spectra and the second set of color spectra, as default stored spectral distribution mapping information;
    setting each of the lighting channels to their respective calibration settings;
    obtaining a measured light intensity in terms of an illuminance value for each of the second set of color spectra at the area of interest; and
    deriving a calibration matrix K, based on the set of total light outputs in terms of luminous flux, the spectral distribution mapping and the measured light intensities in terms of illuminance, which calibration matrix provides calibration of the second set of color spectra.

2. The method of claim 1, wherein the first set of color spectra has the same or a smaller number of spectra than the second set of color spectra.

3. The method of claim 2, wherein the first set of color spectra has the same number of spectra as the second set of color spectra.

4. The method of claim 1, wherein the method comprises obtaining or determining an inverse spectral distribution mapping $S^{-1}$.

5. The method of claim 1, wherein the method comprises determining an inverse $K^{-1}$ of the calibration matrix for use in converting between a desired light intensity in terms of illuminance at the area of interest and the required light output settings in terms of luminous flux of the plurality of lighting channels.

6. The method of claim 1, wherein the first set of color spectra comprises three or more color spectra corresponding to three or more lighting channels, and wherein the second set of color spectra comprises three or more color spectra.

7. The method of claim 6, wherein the first set of color spectra comprises deep red, blue, white and far-red, and the second set of color spectra comprises blue, green, red and far-red.

8. The method of claim 1, wherein the light output settings in terms of luminous flux for each of a plurality of lighting channels are expressed in photosynthetic photon flux PPF, and the light intensity in terms of illuminance at an area of interest for each of a second set of color spectra is expressed in photosynthetic photon flux density PPFD.

9. The method of claim 1, comprising deriving the calibration matrix K as:

$$K = S \cdot \text{diag}(S^{-1} \cdot PPFD_{cal}) \cdot \text{diag}(PPF_{cal|ch})^{-1} \cdot S^{-1}$$

in which:
$PPFD_{cal}$ is a vector of the measured light intensities in terms of illuminance values;
$PPF_{cal|ch}$ is a vector of the total light outputs in terms of luminous flux values;
$S$ is a matrix defining the spectral distribution mapping;
$S^{-1}$ is a matrix defining an inverse spectral distribution mapping; and
$\text{diag}(\ldots)$ is the diagonal matrix operator.

10. The method of claim 1, comprising measuring the light intensity in terms of the illuminance for each of the second set of color spectra at the area of interest.

11. The method of claim 1, for calibrating a horticultural lighting system, wherein the area of interest at which the light intensities in terms of illuminance values are measured comprises a plant canopy.

12. A non-transitory computer readable medium comprising instructions which, when said instructions are executed by a processor of the multi-channel lighting system, cause the processor to perform the method of claim 1.

13. A multi-channel lighting system comprising:
a luminaire having a plurality of lighting channels (CH1 ... Chn), each lighting channel (CH1 ... Chn) being controllable to provide light output in a particular color spectrum from a first set of color spectra;
a light sensor configured to measure light intensities in terms of illuminance at an area of interest, for each of a second set of color spectra;
a memory stored therein:
  a set of total light outputs in terms of luminous flux values from the multi-channel lighting system, each one of the set being for a respective lighting channel when the lighting channel is operated at a respective calibration setting, as default stored calibration information, and
  a spectral distribution mapping S between the first set of color spectra and the second set of color spectra, as default stored spectral distribution mapping information;
a processor configured to receive the measured light intensities from the light sensor, the processor configured to:
  obtain a set of total light outputs in terms of luminous flux values from the multi-channel lighting system, each one of the set being for a respective lighting channel when the lighting channel is operated at a respective calibration setting, as default stored calibration information;
  obtain a spectral distribution mapping S between the first set of color spectra and the second set of color spectra, as default stored spectral distribution mapping information;
  set each of the lighting channels to their respective calibration settings;
  obtain a measured light intensity in terms of an illuminance value for each of the second set of color spectra at the area of interest; and
  derive a calibration matrix K, based on the set of total light outputs in terms of luminous flux, the spectral distribution mapping and the measured light intensities in terms of illuminance, which calibration matrix provides calibration of the second set of color spectra, the calibration matrix for converting between non-calibrated light outputs in terms of luminous flux per lighting channel (Ch1 ... Chn) and the resulting calibrated light intensity in terms of illuminance at an area of interest, for each of a second set of color spectra; and
the memory for storing therein the determined calibration matrix.

14. The lighting system of claim 13, comprising a horticultural lighting system, wherein the area of interest comprises a plant canopy.

15. The lighting system of claim 13, comprising an animal farming system, wherein the area of interest comprises location of animals.

* * * * *